Patented Aug. 10, 1937

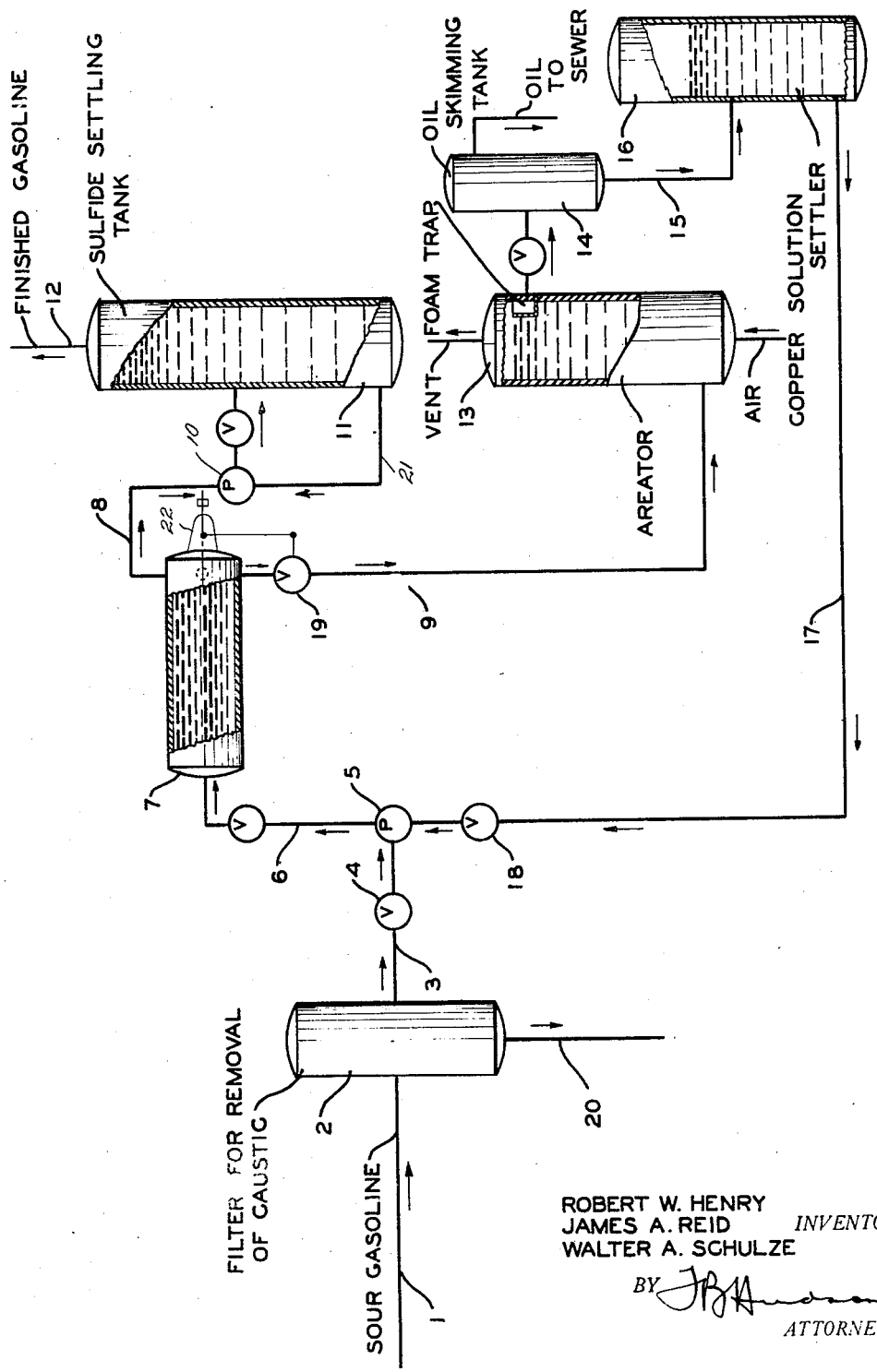

2,089,373

UNITED STATES PATENT OFFICE 2,089,373

APPARATUS FOR TREATING HYDROCARBON OILS

Robert W. Henry, Okmulgee, and James A. Reid and Walter A. Schulze, Bartlesville, Okla., assignors to Phillips Petroleum Company, a corporation of Delaware Application August 19, 1935, Serial No. 36,918

1 Claim. (Cl. 196—46)

This invention relates to the sweetening of gasoline with metal halides. More specifically, it provides an improved apparatus wherein such sweetening may be conducted in a more advantageous manner and with a maximum of efficiency by means to be described.

Processes for the sweetening of petroleum distillates with metal halides (usually cupric chloride, or sodium chloride and copper sulfate) have been described in the past. In these prior processes the gasoline usually is agitated with a considerable volume of the copper chloride solution, the agitation is then stopped and the solution allowed to settle, after which the gasoline is decanted and the solution regenerated by blowing with air. We have found that the use of such apparatus and procedure is undesirable in many respects in the sweetening of gasolines with copper treating solutions, and this invention has for its object the provision of apparatus wherein the copper chloride sweetening may be more suitably and economically conducted.

We have devised a cyclic or continuous system for treating with copper halides which possesses many operating advantages and yields a superior product. Essential to its operation is a suitable choice of structural material, the removal of alkaline materials which may be suspended in the hydrocarbons previous to contacting with metal halide solution, the contacting of the gasoline with the active copper solution by means of a centrifugal pump or some equivalent mixing device, rapid separation of the two liquids, and immediate contact of the oil with an alkaline sulfide or other stabilizing alkaline solution by means of a second pump, or equivalent mixing device.

The copper solutions suitable for sweetening hydrocarbon oil are extremely corrosive to all the common metals and alloys. These solutions attack iron and its alloys very vigorously, the iron going into solution and the cupric copper being in turn reduced to the cuprous state and then to metallic copper. Consequently the iron or steel is soon eaten away. As a result of these characteristics it is necessary that stoneware, wood, plastic and/or rubber materials be used in all portions of the system in contact with the copper solution.

In ordinary refinery practice the sour gasoline which is to be sweetened is usually subjected to a caustic wash to remove hydrogen sulfide from the oil prior to the sweetening operation. In many cases this caustic washed gasoline stream contains suspended fine droplets of caustic which have not yet settled out. If this caustic is not removed from the oil before the oil is contacted with a copper treating solution, the caustic will react with the said copper solution, thereby precipitating copper hydroxide (or copper sulfide if the caustic solution contains sodium sulfide). These suspended solids then promote emulsification in the copper sweetening step and cause loss of treating solution, slow settling and poor separation at a point where a minimum settling time is not only desirable but in many cases absolutely necessary, and contamination of subsequent equipment and treating solution. Removal of any suspended alkaline material which may be present, an essential to satisfactory operation of the process, may be accomplished by means of a filter or coagulator containing asbestos or similar suitable material by centrifuging, or by settling for some time before further treating.

It has been found that the more rapid and intimate the contact of copper treating solution with the sour oil the more uniform and complete is the sweetening step. It has been found, also that the resulting intimate mixture must rapidly and completely separate into the oil and aqueous phases as soon as possible, if undesirable side reactions are to be avoided with cracked gasolines. It is essential that the copper solution be quickly removed so that the oil can be immediately contacted with a stabilizing medium, such as the alkaline sulfide solution described in U. S. Patent 1,980,555 issued November 13, 1934, entitled "Process for treating oils with an alkaline sulfide." Many cracked gasolines, after contacting with copper solution, are exceedingly color and gum unstable, and immediate contacting with a stabilizing medium, such as an alkaline sulfide, is necessary. Any solution which acts as precipitant for the traces of the metal compounds in the gasoline may be substituted, of course, for the sulfide. Sprays, jet contactors, turbulent flow, etc., have been found unsatisfactory in many cases in that unsatisfactory sweetening and many slowly-settling fine droplets result. Slow settling results in color loss, color instability and loss of treating solution through carry-over. It has been found that very intimate contacting and mixing, yet rapid settling, can be obtained through the use of a corrosion resisting (for example, stoneware) centrifugal pump. By this method there is obtained, also, advantage of control of relative volumes of copper solution and oil.

From the contacting pump the mixture passes to a tank so designed that as little turbulence and as rapid settling as possible is obtained. The oil and copper solution are withdrawn continuously from the top and bottom of the tank respectively. The tank, of resin composition or the like, is such size that the gasoline is in it only sufficiently long that the copper solution is adequately settled from it. In order that this time of retention may be further controlled, a liquid level control maintains the oil-copper solution interface at the desired level.

The copper solution flows continuously to an aerating or regenerating tank where it is blown with oxygen-containing gas so as to reduce the cuprous copper concentration of the solution and prepare the solution for repeated use. Following this regeneration the copper solution flows to a tank from which it is drawn for contacting with subsequent portions of sour gasoline. This tank serves a further purpose as a clarification tank, any solids settling to the bottom and any gasoline carried in the copper solution accumulating on the surface of the treating solution.

The gasoline flows from the copper solution-gasoline settling tank through as short a course as possible to a second pump, or mixing device, where it is intimately contacted with an alkaline stabilizing solution as described above. The mixture thence passes to a settling tank from which the finished gasoline is withdrawn. The sulfide solution is withdrawn from the bottom of this tank and recirculated to the stabilizing pump.

Referring to the attached drawing, sour gasoline enters the system through the line 1. A filter, 2, removes any traces of caustic solution which may be entrained with the gasoline, after which it is passed through the line 3 and the valve 4 to the pump 5. The active copper treating solution is simultaneously introduced into the pump 5 through the line 17 and the valve 18 in the desired quantity, being thoroughly mixed with the sour gasoline by the pump 5, which is preferably of the centrifugal type. From this pump, the mixture passes through the line 6 into the tank 7 wherein separation of the sweetened gasoline from the treating solution is effected. This tank may be fitted with a liquid level control valve. We have also found that the size of this separating tank is quite critical, since it must provide for effective separation of the two liquids while holding the time of contact of the two liquids to a minimum. A tank 5 feet in diameter and 12 feet long is suitable for the settling of about 5000 barrels of gasoline per day. A larger tank may of course, be used provided that the liquid level control valve is set at the proper position in the tank.

From the tank 7, the gasoline passes through a line 8 to a pump 10, wherein it is contacted with sodium sulfide solution coming from the lower section of tank 11 through line 21 to remove the last traces of copper compounds from the oil. The mixture then passes to the settling tank 11 from which the finished gasoline passes through the line 12 to storage. The treating solution after its separation from the gasoline in the tank 7 passes through the valve 19 which is actuated by an automatic liquid level control device 22. This device controls the copper treating solution level, and thus the volume of the gasoline in the tank 7. The treating solution passes through valve 19 and the line 9 to the aerator 13 where it is regenerated by blowing with air or an oxygen containing gas. From this it passes through the oil skimmer 14, in which any entrained oil is separated, through the line 15 to the solution settler 16. The regenerated copper treating solution is withdrawn from tank 16 through line 17 through valve 18 to pump 5 as is needed for contacting additional quantities of sour gasoline. Any accumulation of caustic is periodically withdrawn through the line 20.

In the assembly of this apparatus, a pump is shown as the means of contacting the sweetened gasoline with the stabilizing solution. In this step it is exceedingly important that intimate contact between the oil and treating solution be obtained, but the method of contacting is by no means limited to that obtainable in a pump; in other words, a jet or sprays could be used for the purpose. It does not matter if fine droplets of the sulfide treating solution are present in the gasoline immediately after the contacting step (additional time here does not cause any deterioration of the gasoline), providing, of course, that the settling tank is sufficiently large for adequate settling thereafter.

As pointed out above, the apparatus herein described represents an important advance in the art of sweetening with copper treating solutions in that the most unstable and highly sour gasolines may be completely sweetened, products of superior gum and color stability resulting. Also, the assembly of the apparatus into a compact, readily controlled unit represents an important advance in that (1) the investment cost is relatively low, (2) the ease of operation of the unit makes for low operating costs, (3) the loss of hydrocarbon oil which heretofore has generally occurred in sweetening processes is entirely avoided, and (4) mechanical and other losses of treating solutions are minimized.

It is evident to those skilled in the art that the assembly of the essential parts of the apparatus can be made in several different ways without departing from the scope of this invention; therefore, the diagrammatic illustration is given merely by way of example.

We claim as our invention:

An improved apparatus for practicing a continuous process of sweetening a mercaptan-bearing oil, which comprises, a corrosion-resistant centrifugal pump, wherein said oil is mixed and contacted with a sweetening solution comprising copper sulfate and sodium chloride, the inlet of said pump being connected by separate conduits to a source of mercaptan-bearing oil and to a settling tank containing sweetening solution, a corrosion-resistant separating tank, wherein the mixture of oil and solution are settled and separated into an upper layer of sweetened oil and a lower layer of partially spent sweetening solution, an inlet about midway of the height of said tank, a conduit connecting the discharge of said pump to the inlet of said separating tank, an upper outlet in said separating tank for withdrawal of sweetened oil, a lower outlet in said tank for withdrawal of partially spent solution, a vented aerating tank to receive the spent solution, a conduit connecting said aerating tank to said lower separating tank outlet, an automatic liquid level control valve in said conduit to control the solution level in the separating tank, means for introducing air into the spent solution in the aerating tank, whereby the solution is regenerated, a solution settling tank, a conduit connecting said solution settling tank with the aerating tank, a second centrifugal pump wherein sweetened oil is mixed and contacted with a stabilizing solution to remove traces of copper compounds from the oil, a stabilizing solution settling tank wherein the mixture of oil and stabilizing solution are separated and settled to a lower layer of stabilizing solution and an upper layer of stabilized oil, separate conduits connecting the inlet of said second pump with the upper outlet of the sweetened oil separating tank and a lower outlet of the stabilizing solution settling tank, a conduit connecting the discharge of said second pump with an inlet of said stabilizing solution tank about midway of the height of said tank, and a conduit connected to an upper outlet of said tank for removal of stabilized oil.

ROBERT W. HENRY.
JAMES A. REID.
WALTER A. SCHULZE.